Patented Dec. 31, 1935

2,026,237

UNITED STATES PATENT OFFICE 2,026,237

YEAST FERMENTATION PROCESS

David A. Legg, Terre Haute, Ind., assignor to Commercial Solvents Corporation, Terre Haute, Ind., a corporation of Maryland No Drawing. Application June 8, 1932, Serial No. 616,101

11 Claims. (Cl. 195—20)

The present invention relates to the alcoholic fermentation of waste residual materials obtained in the acid hydrolysis of grain or starch. More particularly, the present invention relates to the alcoholic fermentation of hydrol, the waste residual material from the corn sugar industry.

Hydrol comprises the molasses obtained as the residual mother liquor from which corn sugar is crystallized. This material contains about 75% solids, the major portion of which comprises glucose. In view of the high sugar concentration, various attempts have been made to utilize this material for alcoholic fermentation, but up to the present time all of these attempts have met with failure. It has been definitely shown by many investigators that of the total sugar present, only about 70% is fermentable by yeast. For example, W. Ekhard (Z. Spiritusind 50, 145, 1927) on investigating such materials from a commercial standpoint concluded that only 70% of the sugar produced by the acid hydrolysis of maize is fermentable. In view of the resulting low yields, the fermentation has therefore not been commercially feasible and the hydrol has been diverted into other and less profitable channels such as use in stock feed and the like.

The unfermentable portion of the carbohydrate in hydrol has been studied by Berlin (J. American Chem. Society 48, 2627, 1926) who concluded that this material constitutes what is known as "isomaltose", which contains a small amount of gentiobiose. Other investigators have shown that the isomaltose includes hexosans, dextrinose, glucosylglucose, revertose, degradated types of dextrins, and the like. In short, the constitution of the unfermentable portion of this material can be said to be practically unsettled and there have been no positive indications as to what treatment might be given the material to change it to a fermentable form. Since the material is obtained as a product of acid hydrolysis it was thought to be improbable that further hydrolysis would have any beneficial effect. In fact the only hydrolysis of such material reported in the literature (Zemplén and Bruckner, Ber. 64B, 1852, 1931) shows that various fractions of the material are differently affected by further hydrolysis. For example, one fraction which had a zero reducing power before hydrolysis, had a reducing power of only 12.3% that of glucose after hydrolysis. Another fraction which had a reducing power of 40% that of glucose before hydrolysis had a reducing power of 80% that of glucose after hydrolysis. It was therefore believed to be improbable that such slight changes would have any material effect upon the fermentability of this material.

However, the surprising discovery has now been made that if the hydrol as such, and not merely the unfermentable portion, is subjected to ordinary acid hydrolysis such as is used for the hydrolysis of soluble starch or the inversion of sugar, the fermentation yield is greatly increased, in some cases more than 50%.

The hydrolysis may be carried out in any known manner, but as is the case with all sugar solutions, it is preferable not to unduly prolong the heating, in order to prevent caramelization of the sugar. A suitable method of hydrolysis has been found to be the following: Hydrol is heated from 30-50 minutes at a pressure of 40 lbs. per sq. in. in a 20-25% sugar concentration with sulphuric acid equal to about 3% by weight of the hydrol or with an equivalent mixture of acid and calcium superphosphate. It is seen that according to this procedure the hydrol is directly subjected to hydrolysis without the necessity for any pretreatment such as precipitation, flocculation, or the like. The resulting solution is then adjusted to a hydrogen ion concentration within the known operative limits for yeast fermentation. For this purpose any of the commonly used neutralizing agents may be employed such as caustic soda, lime, calcite, soda ash, and the like. It may be preferable, however, in certain cases, and especially where the nitrogenous nutrient content of the medium is low, to neutralize with ammonia. In such a case the resulting ammonium sulphate serves as at least a part of the nutrient for the yeast fermentation.

If waste residual material from the hydrolysis of grain is utilized, there may be sufficient nitrogenous material present for a satisfactory yeast fermentation. However, in the corn sugar industry the usual practice is to purify the starch before hydrolysis so that the resulting hydrol contains little or no nitrogenous nutrient. In such cases it is advisable to add soluble nitrogen in the form of distillery slop from the butyl-acetonic fermentation or from other fermentation industries, steep water, hydrolyzed whole corn, or saccharified malt. The butyl-acetonic slop has been found to be superior to the other nutrients mentioned and is preferred for this process. Since this material is not obtained in concentrated form it is substituted for a part of the water as the diluent in preparing the mash from hydrol. Thus, a 50% mixture of butyl-acetonic slop and water has been found to be eminently satisfactory for diluting the hydrol to a fermentable concentration.

The other conditions for this fermentation may be the same as those usually employed in the alcoholic fermentation. For example, the usual temperature may be employed although it is preferable to operate at a temperature of about 27° C. Likewise, the usual hydrogen ion concentration limits may be employed although it is preferable to conduct the fermentation at a pH of about 5.0 in order to reduce the possibility of contamination. However, according to the usual method of carrying out this process the entire mash is subjected to hydrolysis and is therefore completely sterilized prior to inoculation. In such cases a pH of 5.0–6.0 has been found to be eminently satisfactory. Furthermore, the usual mechanical or procedural steps for carrying out the yeast fermentation may be employed in this process. For example, the fermentation may be carried out continuously as well as in the usual batch process.

Any of the usual types of yeast may be employed, and with the ordinary distillery yeasts practically identical results are obtained with various strains. For example, equally satisfactory results are obtained with Fleischmann strain Y or Wallerstein strain 53. It has been found that although practically any distillery yeast will give satisfactory results, improved results may be secured if the culture is carried for a number of generations upon a medium containing hydrol. This indicates that although the hydrolysis of the hydrol vastly improves the results, there are still some materials present which are slightly inhibitory to yeasts. However, by "acclimatizing" the yeast cultures to hydrol mashes, this difficulty is apparently overcome.

The invention may perhaps best be illustrated by the following specific examples:

Example I

Hydrol is diluted to about 30% concentration (i. e. about 22.5% sugar) and is subjected to hydrolysis for 45 minutes at 40 lbs. per sq. in. pressure in the presence of about 3% sulphuric acid by weight of hydrol. Steep water in the form of concentrated steep water obtained in cornstarch refining is then added to the resulting solution in a concentration of 0.5% (dry basis) and the mash is diluted to a concentration of about 17% on the original hydrol. The mash is then neutralized with lime to a pH of 5.2–5.4 and inoculated with about 4% by volume of a fourth generation yeast culture developed on hydrol wort. Fermentation is allowed to proceed at 27° C. for about 72 hours.

Example II

A mash is prepared by diluting hydrol with a 50% aqueous suspension of butyl-acetonic slop to a hydrol concentration of 18%. The mash is then subjected to hydrolysis at 40 lbs. pressure for 45 minutes in the presence of 0.4% concentrated sulphuric acid by volume. The resulting mash is neutralized and fermented as in Example I above.

Example III

A mash is prepared containing 17% hydrol and 3% whole ground corn. This mash is then hydrolyzed, neutralized and fermented as in Example II above.

Example IV

A mash containing 19% hydrol and 1% whole ground corn is subjected to hydrolysis for 45 minutes at 40 lbs. pressure in the presence of 0.5% of concentrated sulphuric acid by volume. The resulting mash is neutralized with ammonia to a pH of 5.2–5.4 and is then inoculated and fermented as in the case of Example I above.

The beneficial results obtained by hydrolyzing the hydrol prior to fermentation are illustrated in the following table showing comparative fermentations of hydrolyzed and unhydrolyzed hydrol. The mash for these fermentations comprised varying concentrations of hydrol in 50% butyl-acetonic slop. These mashes were prepared and the fermentations carried out as in Example II above with the exception that a duplicate fermentation was carried out in each case leaving out the hydrolysis step.

Table I

| Composition of mash | Percent alcohol in fermented mash | Yield, percent by weight of hydrol | Percent increase in yield by hydrolysis |
|---|---|---|---|
| 17% unhydrolyzed hydrol | 2.9 | 19.5 | |
| 17% hydrolyzed hydrol | 4.4 | 25.9 | 53.2 |
| 18% unhydrolyzed hydrol | 3.6 | 20.0 | |
| 18% hydrolyzed hydrol | 4.7 | 26.1 | 30.5 |
| 19% unhydrolyzed hydrol | 3.2 | 17.2 | |
| 19% hydrolyzed hydrol | 4.8 | 21.0 | 22.1 |

As may be seen from the above table, the increase in yield obtained by the hydrolysis of the hydrol amounts to from 20% to over 50%, depending upon the concentration employed. This indicates that the best results are obtained with the lower concentrations of hydrol, but of course economic considerations will determine the actual concentration to be employed. If too low a concentration is used, the added advantage of increased percentage yield will be offset by the decreased absolute yield and the resulting increased cost of recovery from the dilute fermentation liquor. In most cases, however, a concentration of 17% will be found to be eminently satisfactory.

It is to be distinctly understood that the above examples are given by way of illustration and the invention is not to be taken as limited to the particular mashes utilized or the particular conditions employed. Known equivalents and modifications which would naturally occur to one skilled in the art may be employed without departing from the spirit of the invention.

The term hydrol as used in the specification and in the appended claims is to be taken to mean any concentrated saccharine residue obtained in processes involving the acid hydrolysis of starchy materials, and particularly the mother liquors from which sugars are crystallized in such processes. Thus, in addition to the materials specifically referred to above which are obtained in the preparation of corn sugar from purified cornstarch, the term may include residues obtained in the hydrolysis of other starches or starchy materials other than maize, for example, wheat or other grains, potatoes, tapioca, etc. As will be evident to one skilled in the art if unpurified starchy materials are employed in the process sufficient nitrogenous nutrients will remain in the waste residues so that it will be unnecessary to add further nutrients for the fermentation. However, in the case of practically all mother liquors from which sugars are crystalized, there will be insufficient nitrogen for efficient fermentation and further nutrients should be added in the manner specified above.

The invention now having been described, what is claimed is:

1. In a process for preparing from hydrol a yeast fermentable mash of a high degree of fermentability the steps which comprise directly subjecting said hydrol, at a sugar concentration suitable for yeast fermentation, to acid hydrolysis and adjusting the hydrogen ion concentration of the resulting solution, by means of ammonia, to a value within the operative limits for yeast fermentation.

2. In a process for preparing from hydrol a yeast fermentable mash of a high degree of fermentability the steps which comprise directly subjecting said hydrol, at a sugar concentration of less than 25%, to acid hydrolysis and adjusting the hydrogen ion concentration of the resulting solution, by means of ammonia, to a value within the operative limits for yeast fermentation.

3. In a process for increasing the fermentability of hydrol, the step which comprises directly subjecting said hydrol, at a sugar concentration suitable for yeast fermentation, to acid hydrolysis.

4. In a process for increasing the fermentability of hydrol, the step which comprises directly subjecting said hydrol, at a sugar concentration of less than 25%, to acid hydrolysis.

5. In a process for the production of ethyl alcohol from hydrol, the steps which comprise subjecting hydrol to direct acid hydrolysis, preparing a yeast fermentable mash in which the carbohydrate comprises essentially the hydrolysate thus obtained, and subjecting said mash to yeast fermentation.

6. In a process for the production of ethyl alcohol from hydrol, the steps which comprise subjecting to direct acid hydrolysis a mixture of hydrol and nitrogenous material transformable by acid hydrolysis to yeast nutrients, preparing a yeast fermentable mash in which the carbohydrate and nitrogenous nutrients comprise essentially the hydrolysate thus obtained, and subjecting said mash to yeast fermentation.

7. In a process for the production of ethyl alcohol from hydrol, the steps which comprise subjecting to direct acid hydrolysis a mixture of hydrol and fermentation distillery slop, preparing a yeast fermentable mash in which the carbohydrate and nitrogenous nutrients comprise essentially the hydrolysate thus obtained, and subjecting said mash to yeast fermentation.

8. In a process for the production of ethyl alcohol from hydrol, the steps which comprise subjecting to direct acid hydrolysis a mixture of hydrol and butyl-acetonic distillery slop, preparing a yeast fermentable mash in which the carbohydrate and nitrogenous nutrients comprise essentially the hydrolysate thus obtained, and subjecting said mash to yeast fermentation.

9. In a process for the production of ethyl alcohol from hydrol, the steps which comprise subjecting to direct acid hydrolysis a mixture of hydrol and maize steep water, preparing a yeast fermentable mash in which the carbohydrate and nitrogenous nutrients comprise essentially the hydrolysate thus obtained, and subjecting said mash to yeast fermentation.

10. A yeast fermentable mash containing, as the essential carbohydrate material, the hydrolysate from direct acid hydrolysis of hydrol.

11. A yeast fermentable mash containing, as the essential carbohydrate and nitrogenous nutrients, the hydrolysate from direct acid hydrolysis of a mixture of hydrol and nitrogenous material transformable to yeast nutrients by acid hydrolysis.

DAVID A. LEGG.

CERTIFICATE OF CORRECTION.

Patent No. 2,026,237.  December 31, 1935.

DAVID A. LEGG.

It is hereby certified that error appears in the printed specification of the above numbered patent requiring correction as follows: Page 2, second column, line 24, in the table, for "53.2" read 32.8; and line 31, for "50%" read 30%; and that the said Letters Patent should be read with these corrections therein that the same may conform to the record of the case in the Patent Office.

Signed and sealed this 3rd day of March, A. D. 1936.

Leslie Frazer (Seal)  Acting Commissioner of Patents.